United States Patent [19]
Zheng et al.

[11] Patent Number: 5,745,477
[45] Date of Patent: Apr. 28, 1998

[54] TRAFFIC SHAPING AND ABR FLOW CONTROL

[75] Inventors: Qin Zheng, Belmont; Randy B. Osborne; John H. Howard, both of Cambridge, all of Mass.

[73] Assignee: Mitsubishi Electric Information Technology Center America, Inc., Cambridge, Mass.

[21] Appl. No.: 591,141

[22] Filed: Jan. 25, 1996

[51] Int. Cl.$^6$ .............................. H04L 12/24; H04L 12/56
[52] U.S. Cl. ........................ 370/230; 370/236; 370/468
[58] Field of Search .................................. 370/395, 230, 370/231, 235, 236, 232, 233, 415, 416, 417, 418, 468, 253, 229

[56] References Cited

U.S. PATENT DOCUMENTS

| | | | |
|---|---|---|---|
| 5,274,644 | 12/1993 | Berger et al. | 370/230 |
| 5,509,001 | 4/1996 | Tachibana et al. | 370/230 |
| 5,515,359 | 5/1996 | Zheng | 370/231 |
| 5,566,163 | 10/1996 | Petit | 370/230 |
| 5,572,520 | 11/1996 | Schenk et al. | 370/235 |

OTHER PUBLICATIONS

Yin et al. "On Closed–Loop Rate Control for ATM Cell Relay Networks", 1994, pp. 99–108.

*Primary Examiner*—Chau Nguyen
*Attorney, Agent, or Firm*—Robert K. Tendler

[57] ABSTRACT

In an ATM network interface controller, a traffic management system is provided to allow implementation of available bit rate, or ABR, flow control by an external processor and the use of a new ABR controller within the traffic management system which provides functions that enable an external processor to control the flow control behavior of the network interface controller. The ABR controller accesses an external memory to control the flow of cells injected into the network. In one embodiment, the subject system uses a traffic shaper to control cell transmission rates, submits requests to an external memory which are processed by an external processor, and reads data from an external memory to adjust cell transmission rates and/or generates Resource Management, or RM, cells. More particularly, in one embodiment, the traffic shaper uses a timing chain approach enhanced with a delay queue which is capable of delaying transmission of i cell for a long period of time, thus being able to accurately control a wide range of cell transmission rates for multiple cell streams independently. The subject system submits requests to an external memory when it receives an RM cell, sends an RM cell, or when reaching a cell transmission limit, initiates processing by an external processor. An external processor communicates with the subject system by writing data into an external memory. The subject system reads data from the memory and determines what cell to send, how long it should be delayed before sending a next cell, thus allowing an external processor to easily control the behavior of an ATM network interface controller to implement a wide variety of flow control schemes.

7 Claims, 7 Drawing Sheets

TRAFFIC SHAPING AND ABR FLOW CONTROL

FIELD OF THE INVENTION

This invention relates to traffic control in a digital communication network and more particularly to a low-cost traffic management system in an ATM network interface controller allowing flexible available bit rate flow control by an external processor.

BACKGROUND OF THE INVENTION

In transmission of data over a cell switched digital communication network, such as an asynchronous transfer mode or ATM network, problems arise when multiple sources send data cells at widely varying rates through a switch node or link of the network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for long periods of time, the buffer storage will be filled to maximum capacity and any additional data must be discarded.

In an effort to minimize such data loss, an available bit rate or ABR flow control scheme has been developed to prevent or inhibit excess data from entering the network. With ABR flow control, the rate at which the data is permitted to enter the network is controlled to not exceed an allowable cell rate, or ACR, and this ACR is adjusted via a feedback signal, usually in a form of resource management, or RM, cells from a network reflecting the congestion of the network. One such ABR flow control scheme is described in an ATM Forum document #95-0013R9 entitled "Traffic Management Specification" authored by Shirish S. Sathaye, December, 1995.

However, implementation of such an ABR flow control system requires a complicated network interface controller to handle RM cells and adjust cell transmission rate based on feedback from the network. Also, the ABR flow control specification is still evolving and it may take a while for it to get finalized. It is thus very important to have a traffic management system for ATM network interface controllers which is easy to implement and capable of following evolving ABR flow control specifications.

By way of background, U.S. Pat. Nos. 5,392,280; 5,381,407; 5,432,713; 5,446,726; and 5,448,567 deal with various traffic control systems for use with ATM or other networks. It will be noted that none of the above listed patents deal with the problem of an inexpensive and flexible closed loop ABR flow control system, much less a system allowing for performing flow control functions external to a network interface controller. It will be appreciated that such controllers are implemented in hardware such that evolution in traffic control schemes can not be readily accommodated.

SUMMARY OF INVENTION

In order to support low-cost and flexible ABR flow control in ATM network interface controllers, a traffic management system is provided which allows ABR flow control through the use of an external processor.

In general, implementation of ABR flow control needs: (1) a rate controller which controls the cell transmission rate of a connection; (2) a resource management, or RM, cell handler which generates RM cells at a source and turns around RM cells at a destination; and (3) a rate adjustor which changes the cell transmission rate of a connection according to network congestion information conveyed back by RM cells.

The subject system uses an timing chain approach enhanced with a delay queue to implement a rate controller which is capable of accurately controlling a wide range of cell transmission rates for multiple cell streams independently as required by ABR flow control. The subject system generates regular RM cells by itself while providing an interface to allow an external processor generate extra RM cells. The way in which RM cells are turned around at a destination is controlled by an external processor. Specifically, received RM cells are forwarded to an external memory which will be read and processed by an external processor. The external processor controls the time and manner that a received RM cell is turned back to its source through the network interface controller. Information contained in RM cells is also interpreted by an external processor which accordingly adjusts the rates that are controlled by a rate controller. This enables an external processor to control the way that ABR flow control is implemented and simplifies the network interface controller hardware significantly.

In summary, in an ATM network interface controller, a traffic management system is provided to allow implementation of available bit rate, or ABR, flow control by an external processor and the use of a new ABR controller within the traffic management system which provides functions that enable an external processor to control the flow control behavior of the network interface controller. The ABR controller accesses an external memory to control the flow of cells injected into the network. By communicating through the external memory no direct interface or multimaster buses are required between the external processor and the network interface controller. The subject traffic management system eliminates the excessive hardware complexity of implementing ABR flow control within an ATM network interface controller and enables evolution of ABR flow control without requiring changes in hardware. In one embodiment, the subject system uses a traffic shaper to control cell transmission rates, submits requests to an external memory which are processed by an external processor, and reads data from an external memory to adjust cell transmission rates and/or generates Resource Management, or RM, cells. More particularly, in one embodiment, the traffic shaper uses a timing chain approach enhanced with a delay queue which is capable of delaying transmission of a cell for a long period of time, thus being able to accurately control a wide range of cell transmission rates for multiple cell streams independently. The subject system submits requests to an external memory when it receives an RM cell, sends an RM cell, or when reaching a cell transmission limit, initiates processing by an external processor. An external processor communicates with the subject system by writing data into an external memory. The subject system reads data from the memory and determines what cell to send, how long it should be delayed before sending a next cell, thus allowing an external processor to easily control the behavior of an ATM network interface controller to implement a wide variety of flow control schemes.

BRIEF DESCRIPTION OF DRAWINGS

These and other features of the Subject Invention will be better understood in conjunction with the Detailed Description taken in accordance with the Drawings of which:.

3

DETAILED DESCRIPTION

Figure 1:
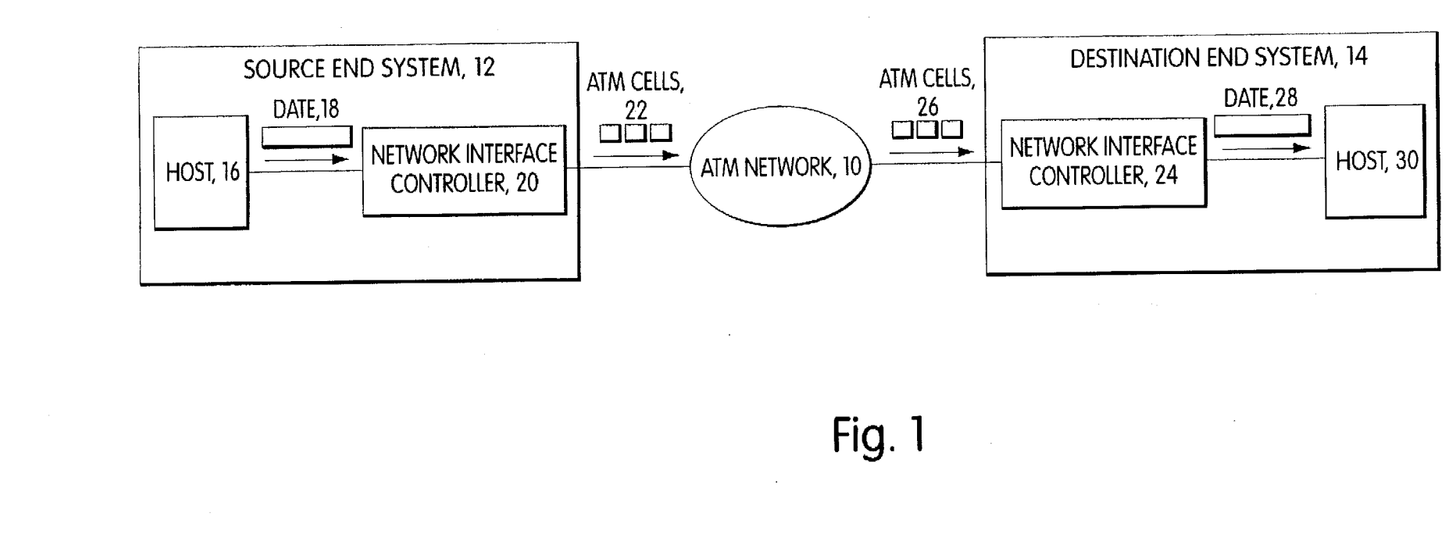
FIG. 1 is a schematic diagram illustrating an ATM network connecting a source end system and a destination end system, in which in a source end system, data is generated by a host, converted into ATM cells and sent to an ATM network by a network interface controller, and in which in a destination end system, ATM cells are received by a network interface controller and converted back into data and forwarded to a host.

Refer now to FIG. 1 which shows transmission of digital data over an ATM network. An ATM network 10 is utilized to connect a source end system 12 to a destination end system 14. In source end system 12, a host 16 generates data 18 which is forwarded to a network interface controller 20. Network interface controller 20 converts incoming data from host 16 into fixed size ATM cells 22 and injects them into ATM network 10. The rate that ATM cells 22 are injected into the network is also controlled by network interface controller 20 to avoid congestion in the ATM network. ATM network 10 accepts incoming cells 22 and forwards them to destination end system 14 according to information contained in the cell header. Network interface controller 24 in destination end system 14 receives ATM cells 26 from ATM network 10, converts them to data 28 and forwards them to host 30.

Figure 2:
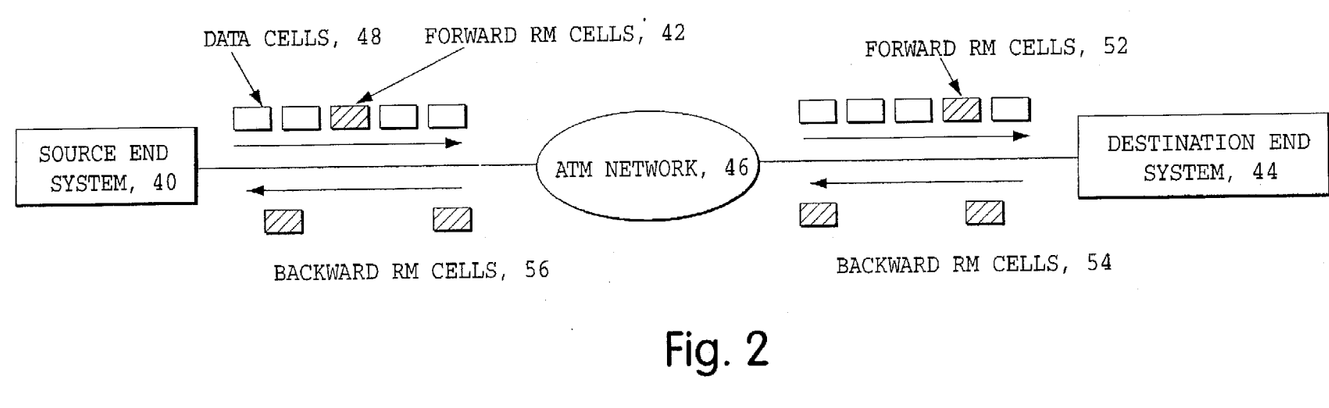
FIG. 2 is a schematic diagram illustrating ABR flow control in an ATM network where RM cells are generated by a source end system together with data cells and turned around by a destination end system to detect network congestion.

Refer now to FIG. 2 which shows ABR flow control over an ATM network. Source end system 40 is required to send forward RM cells 42 to destination end system 44 through an ATM network 46 together with data cells 48. Destination end system 44 receives forward RM cells 52 and sends them back to source end system 40 as backward RM cells 54. Source end system 40 receives backward RM cells 56, reads congestion information contained in the cells which may have been set by ATM network 46 and/or destination end system 44, and adjusts cell transmission rates accordingly. Refer to an ATM Forum document #95-0013R9 entitled "Traffic Management Specification" authored by Shirish S. Sathaye, December, 1995 for more background information about ABR flow control and a detailed ABR flow control scheme that is being specified by the ATM Forum.

Figure 3:
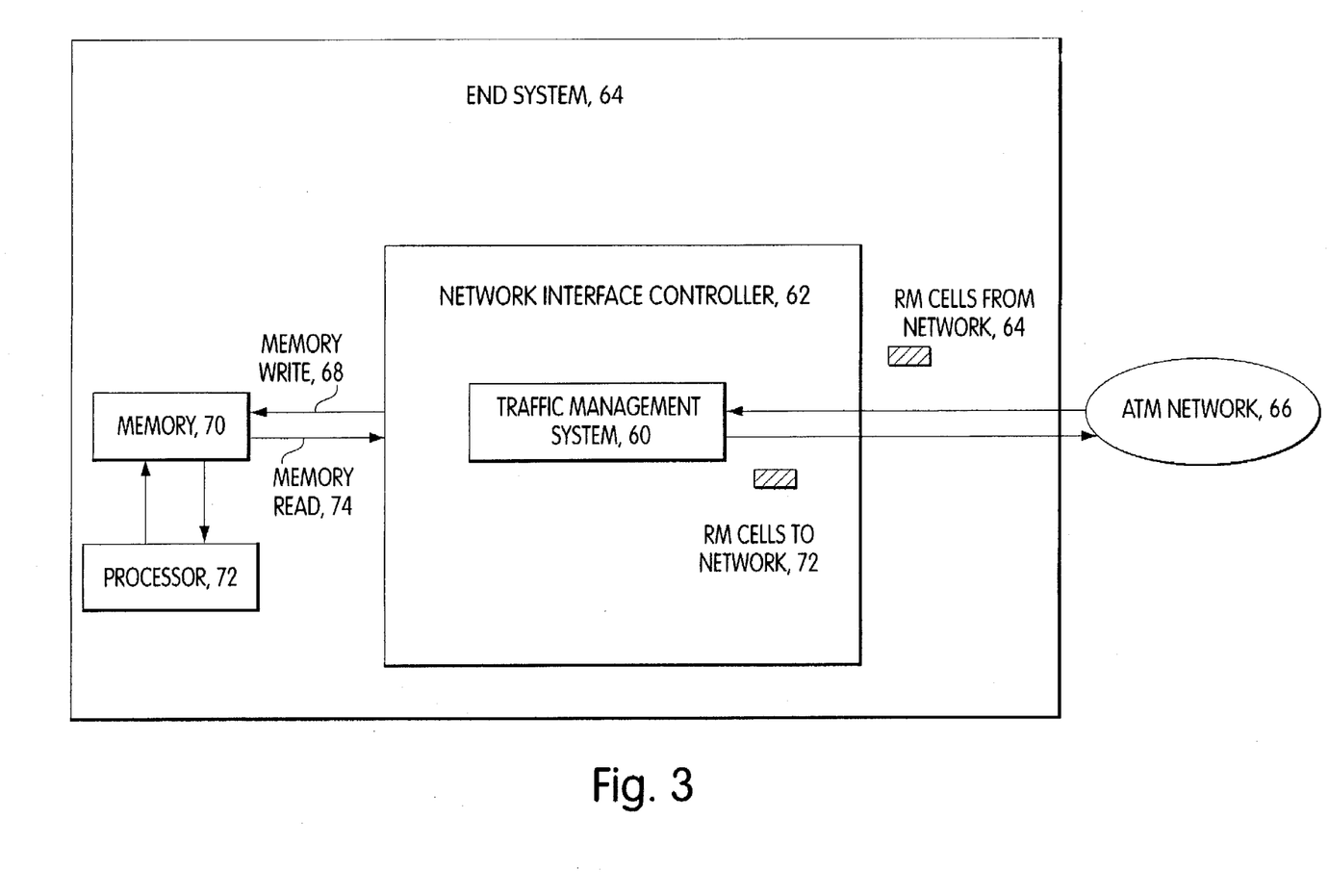
FIG. 3 is a schematic diagram illustrating the usage of the subject traffic management system within a network interface controller to implement ABR flow control.

Refer now to FIG. 3. This figure shows the usage of the subject traffic management system within an end system to implement ABR flow control. The subject traffic management system 60 is shown residing in a network interface controller 62 which forwards received RM cells 64 from ATM network 66 and some other information which will be detailed later as memory write 68 to memory 70 in end system 64. A processor 72 in end system 64 processes RM cells and information deposited in memory 70 and updates contents of RM cells and information stored in memory 70. Upon reading updated information by memory read 74, traffic management system 60 may adjust cell transmission rates, send a forward RM cell or turn around a backward RM cell in addition to transmission of data cells.

The interconnection of the network interface controller 62, memory 70, and processor 72 as shown in FIG. 3 does not require network interface controller 62 to have a direct interface to external processor 72 or a multi-master bus shared by external processor 72 and network interface controller 62. Rather, memory 70 is used to allow memory accesses by processor 72 and controller 62 independently. This further reduces the hardware complexity of network interface controller 62, eliminating the need for a multi-master bus interface or additional bus interface for communication between the external processor and controller. In one embodiment of the interconnection shown in FIG. 3, memory 70 is dual-ported with processor 72 accessing the memory through one port and controller 62 through the other port. In this embodiment processor 72 may be a processor on the same board as controller 62 and separate from the end system host processor. It should be noted that a dual-ported memory is not necessary in an embodiment in which controller 62 does, in fact, have a direct interface to processor 72 or supports a multi-master bus interface to external memory.

Figure 4:
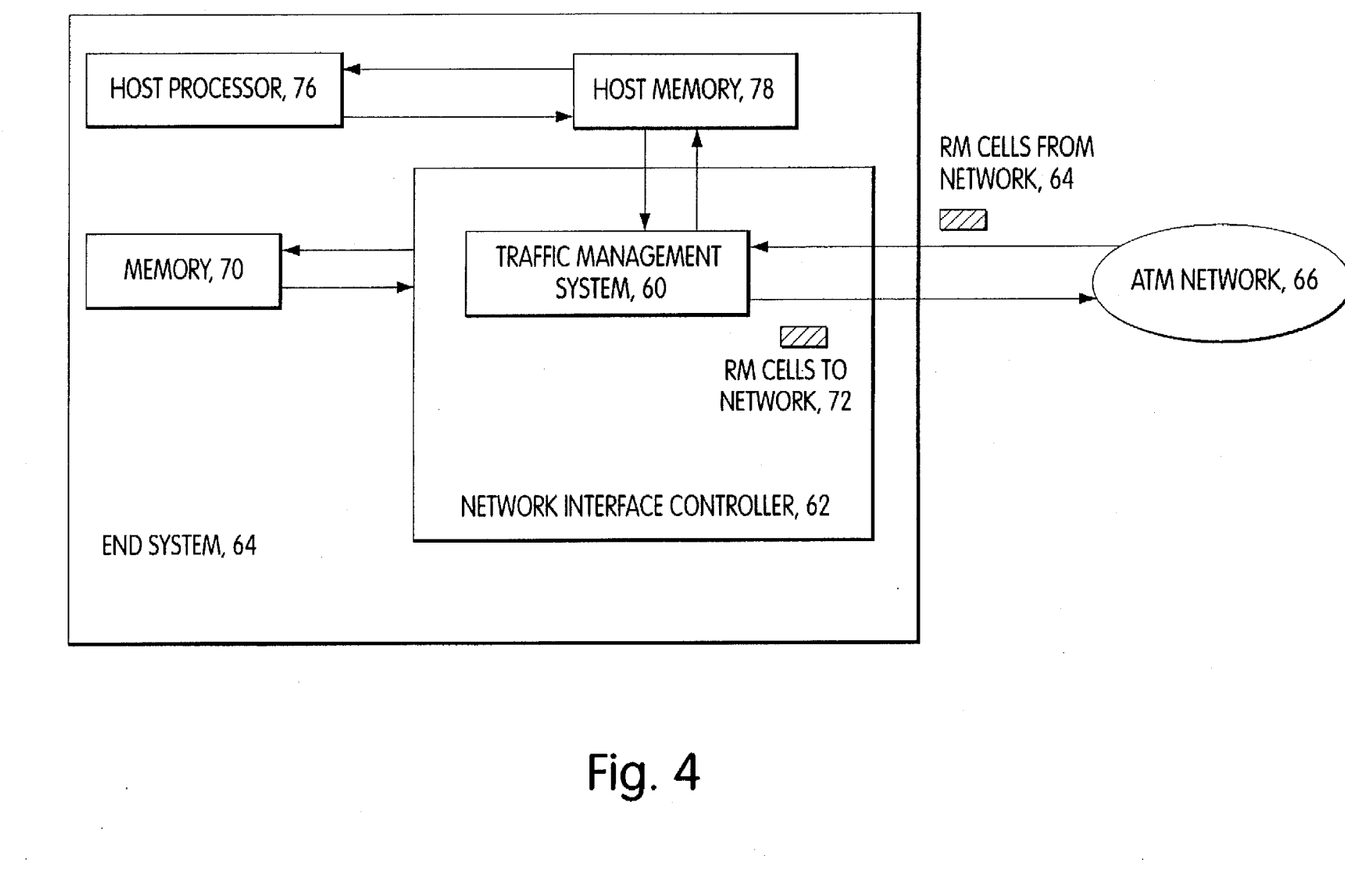
FIG. 4 is a schematic diagram illustrating another way of using the subject traffic management system which uses a host processor for ABR processing.

Refer now to FIG. 4 which shows another configuration that the subject traffic management system can be used in an end system. The end system's host processor 76 can serve as an external processor to network interface controller 62 to perform ABR flow control. The end system's host memory 78 can be used to hold some data stored in memory 70. Host processor 76 may access memory 70 by way of network interface controller 62. This configuration has the advantage of not requiring an additional processor 72 shown in FIG. 3 by using host processor's processing power to implement ABR flow control, thus reducing the cost of an ATM network interface card.

Figure 5:
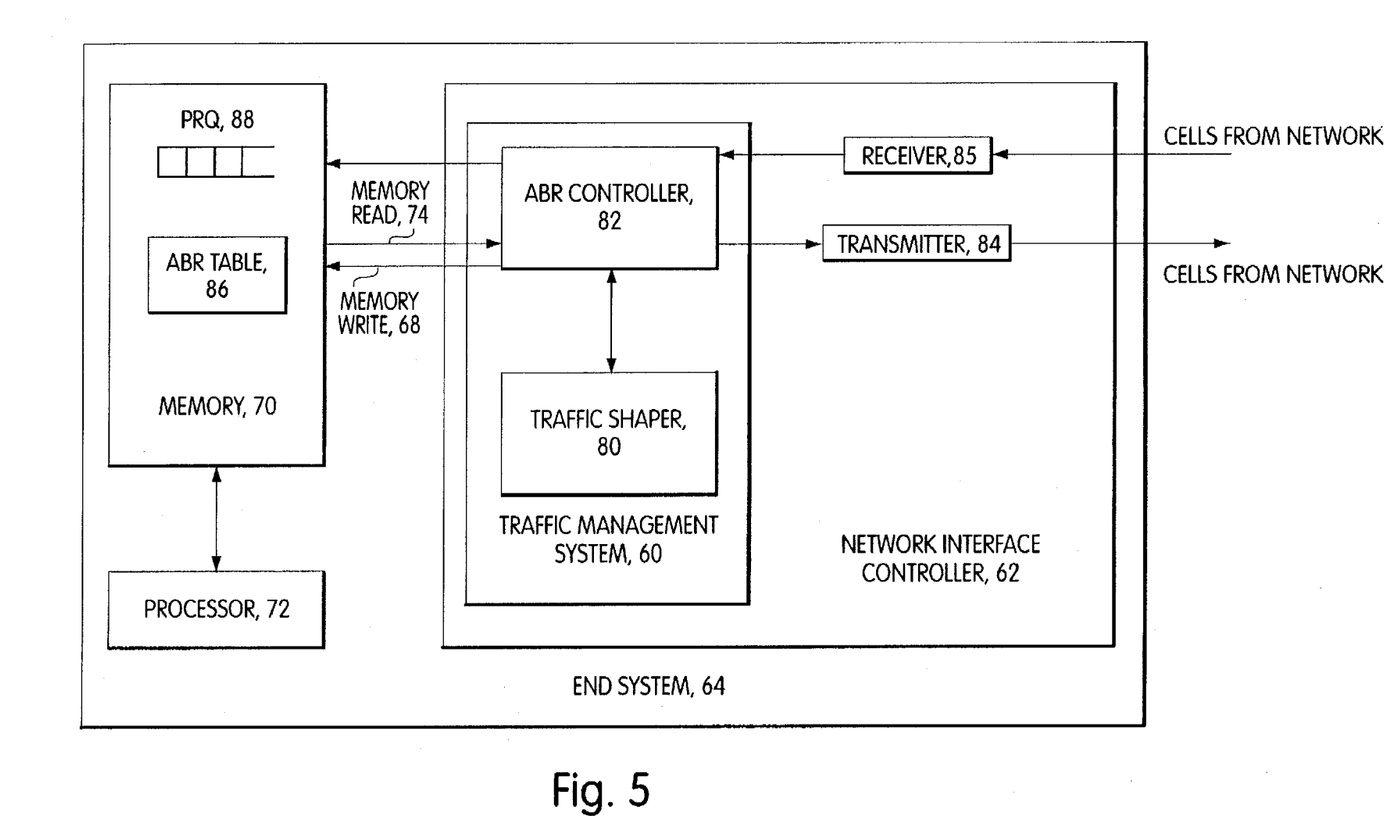
FIG. 5 is a more detailed schematic diagram illustrating functional blocks within the subject traffic management system and data structures stored in an external memory.

Refer now to FIG. 5 which shows one embodiment of internal functional blocks of the subject traffic management system and data structures used in an external memory assuming a configuration of FIG. 3. The subject traffic management system 60 is composed of traffic shaper 80 and ABR controller 82. When transmitter 84 is ready to accept a cell to be transmitted to a network, ABR controller 82 reads traffic shaper 80 to determine if there is a connection or a cell which is eligible for transmission. If a cell is eligible for transmission, ABR controller 82 provides the address where the cell is stored and transmitter 84 gets the data, assembles a cell, and sends it out on the network. If a connection is eligible for transmission and this connection is under ABR flow control, ABR controller 82 reads information from ABR table 86 to determine the type of cell that should be transmitted for the connection and notifies transmitter 84 the address where the cell is stored. Transmitter 84 then gets the data, assembles a cell, and sends it out on the network. ABR controller 82 also determines if it needs to submit a request to a processor request queue, or PRQ 88, to notify processor 72 that some processing is required for the connection. On receiving an RM cell from the network, the ABR controller submits a request to PRQ 88 to permit processor 72 to process the cell. The ABR controller may also interrupt processor 72 after submitting a request to PRQ 88. Finally, ABR controller 82 writes ABR table 86 to record state changes of the connection. If a configuration of FIG. 4 is used, the same functional blocks can be used for traffic management system 60 and it is preferable to move PRQ 88 and some of the information stored in ABR table 86 to host memory 78 for easy access by host processor 76.

Figure 6:
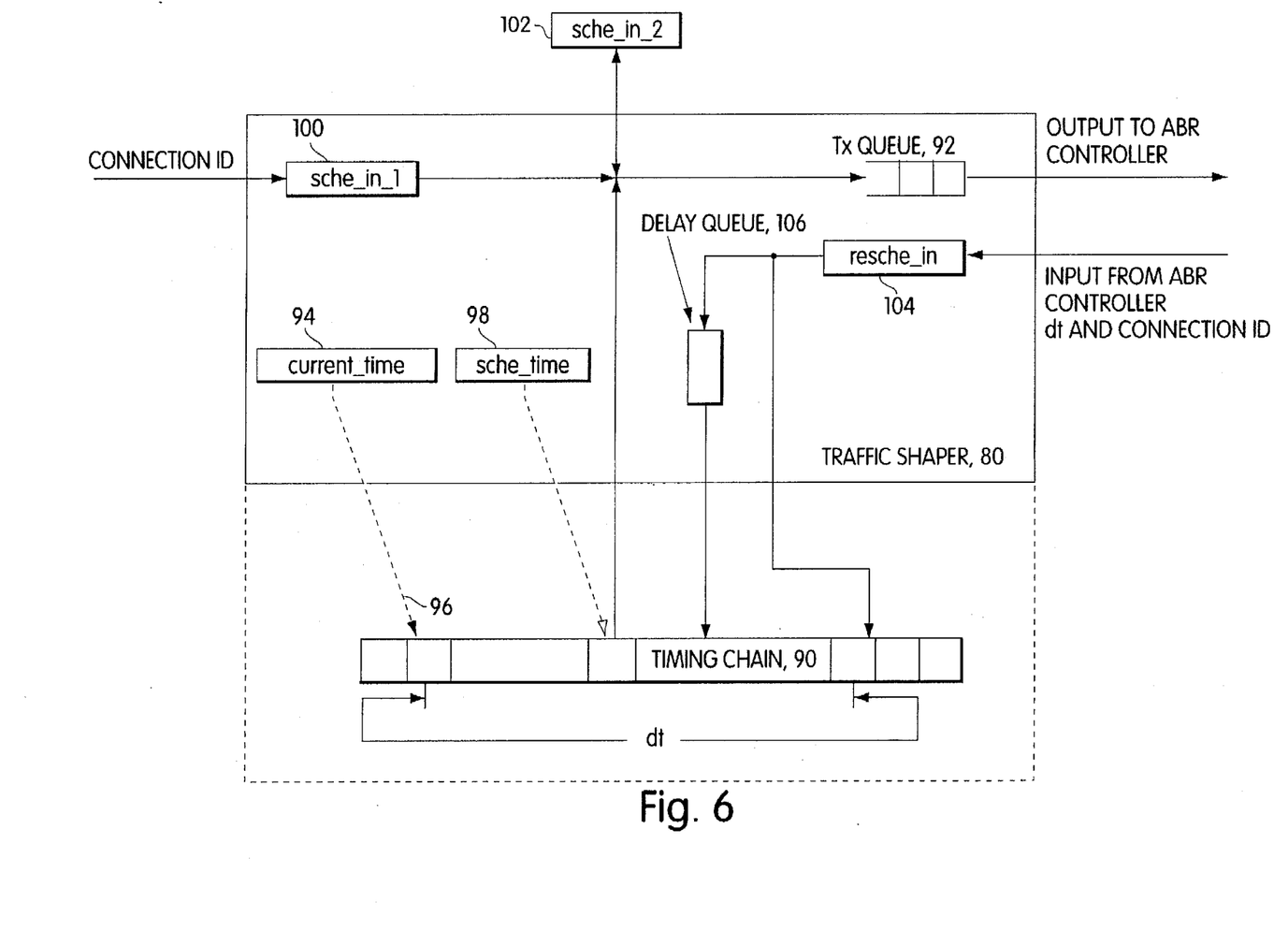
FIG. 6 is a schematic diagram illustrating a rate controller used by the subject system.

Refer now to FIG. 6 which shows one embodiment of traffic shaper 80. A timing chain 90, which may reside within shaper 80 or in an external memory, is used to store connection ID's which are scheduled for transmission. A timing chain is composed of multiple slots with each slot capable of storing a certain number of connection ID's and transmission priority information of each connection. A linked list data structure can be used to store more connection ID's in a slot. A Tx queue 92 is used to store connection ID's and cell addresses which are eligible for transmission. Tx queue 92 may be composed of multiple first-in-first-out, or FIFO, queues to implement multiple transmission priorities. In one embodiment, ABR controller 82 of FIG. 5 reads items from a high priority queue first. A current_time register 94 in shaper 80 points to a slot 96 in the timing chain and moves forward one slot, i.e., points to a slot ahead of the current one every cell time, and wraps around when it reaches the end of timing chain 90. A cell time is the amount of time needed to transmit one cell at the link bandwidth. A sche_time register 98 points to a slot from which connection ID's are being moved to a corresponding FIFO queue of Tx queue 92. The sche_time register moves forward one slot after all connection ID's stored in a slot have been moved to Tx queue 92, until it catches up with current_time register 94. In other words, sche_in never points to a slot ahead of the one pointed by current_time.

A sche_in_1 register 100 in shaper 80 is used to accept a connection ID. The content written into sche_in_1 register 100 is moved directly to Tx queue 92 if it is not full and sche_in_1 register 100 is reset afterwards. Traffic shaper 80 also periodically reads sche_in_2, a register within the shaper or a memory unit 102 external to the shaper, which is used to input a connection ID or a cell address. The content written into sche_in_2 is moved directly to Tx queue 92 if it is not full and sche_in_2 is reset afterwards.

A resche_in register 104 is used to accept a rescheduling request from the ABR controller. When a connection ID together with a time interval dt is written into resche_in register 104, shaper 80 writes the connection ID into a slot which is dt slots ahead of the slot pointed by current_time register 94. If dt is larger than the total number of slots in timing chain 90 minus the difference between current_time and sche_time, the connection ID stored in resche_in is moved to a delay queue 106, which maintains a FIFO queue of connection ID's and the rescheduling timing information, i.e., current_time+dt, is recorded in ABR table 86 of FIG. 5. Again, a linked list data structure can be used to maintain the delay queue. In one embodiment, items stored in delay queue 106 are checked periodically to see if they can be moved to timing chain 90.

The above described traffic shaper has the flexibility of supporting multiple traffic shaping schemes by using different algorithms in calculating dt for a connection that is written into resche_in 104 for rescheduling. Traffic for a connection under ABR flow control needs to be shaped such that two consecutive cells are separated no less than 1/ACR cell times apart, where ACR is the allowable cell rate in a unit of cells per cell time. The calculation of dt for a ABR connection can thus be done as dt=ceil(1/ACR), where ceil(x) is the ceiling function denoting the minimum integer no smaller than x. For a connection that can tolerate a cell jitter of one cell time as defined by a Generic Cell Rate Algorithm GCRA(1/ACR, 1) in an ATM Forum document #95-0013R9 entitled "Traffic Management Specification" authored by Shirish S. Sathaye, December, 1995, calculation of dt can be performed in the following way:

Initialize
  delta=0

$$dt=ceil(1/ACR-delta)$$

$$delta=dt-(1/ACR-delta)$$

Calculation of dt in this way allows more accurate control of the average transmission rate for a connection.

To implement an ABR flow control scheme such as the one specified in an ATM Forum document #95-0013R9 entitled "Traffic Management Specification" authored by Shirish S. Sathaye, the value of ACR can be dynamically set by an ABR controller or an external processor to change the cell transmission rate allowed for a connection to avoid network congestion.

A variable bit rate, or VBR, connection uses yet another traffic shaping scheme called leaky bucket shaping which is described by a peak cell rate PCR in a unit of cells per cell time, a sustainable cell rate SCR in a unit of cells per cell time, and a maximum burst size MBS in a unit of cells as defined in an ATM Forum document #95-0013R9 entitled "Traffic Management Specification" authored by Shirish S. Sathaye. One way of calculating dt for a VBR connection is as follows:

initialize $$MBS'=(MBS+1)/SCR$$

$$credit=2/SCR$$

last_time=0
delta=0
On transmission of a cell for the connection $$credit=min(MBS', credit+current\_time-last\_time)-1/SCR$$

if (credit>=1/SCR)

$$dt'=(1/PCR-delta)$$

else $$dt'=(1/SCR-delta)$$

last_time=current_time
dt=ceil(dt')

$$delta=dt-dt'$$

The above calculation does not need an expensive division operation in hardware if 1/PCR and 1/SCR are precalculated and stored for a VBR connection. Also, the allowance of a jitter of one cell time can be disabled by always setting delta to zero.

Figure 7:
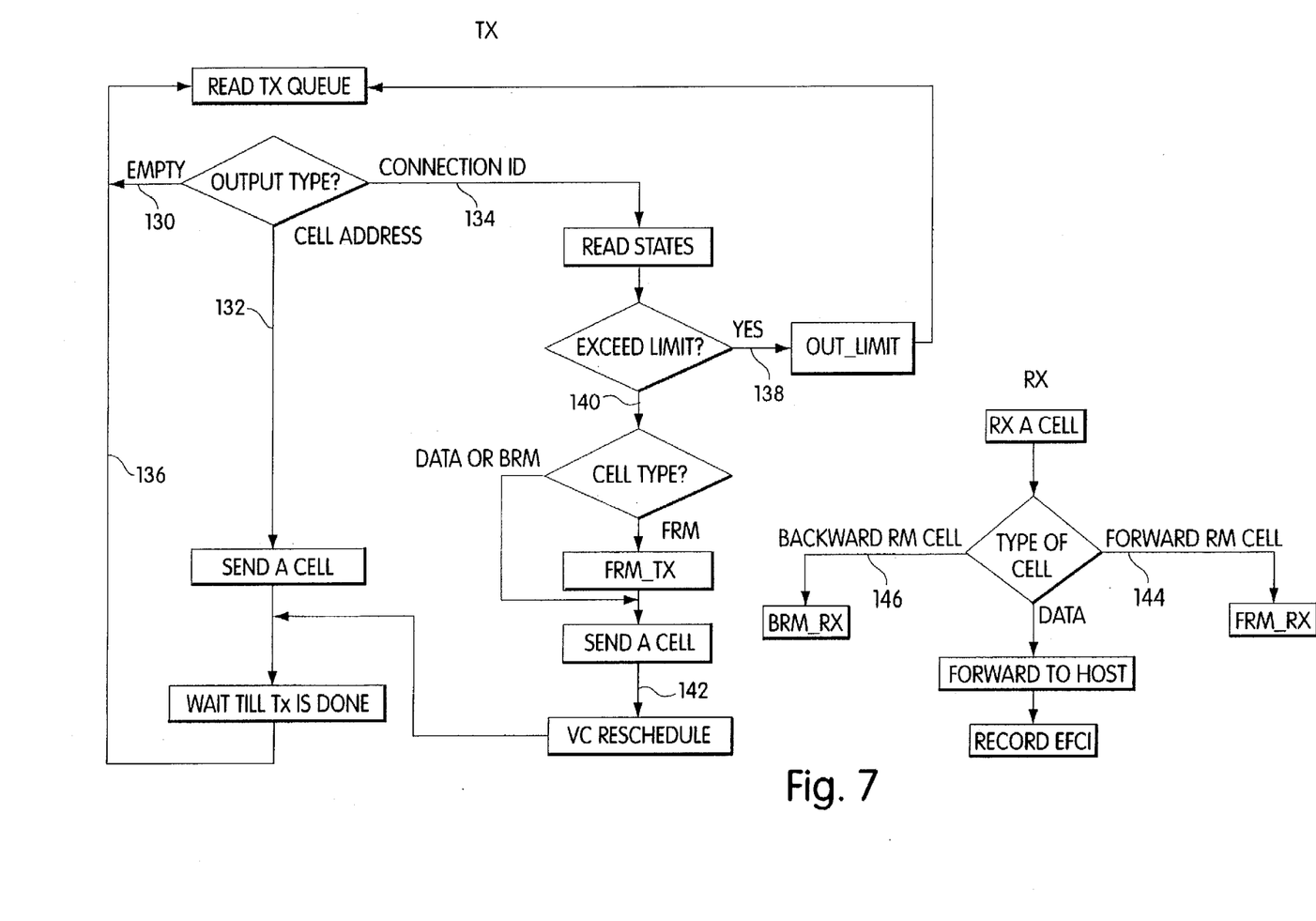
FIG. 7 is a schematic diagram illustrating an algorithm that is used for an ABR controller to enable ABR flow control by an external processor.

Refer now to FIG. 7 which is a flow chart showing one embodiment of ABR controller 82 of FIG. 5 to control an ABR connection. In the transmission direction, ABR controller 82 starts with reading an item from Tx queue 92 in shaper 80 of FIG. 6. If the Tx queue is empty, ABR controller 82 goes back and reads the queue again, as shown by arrow 130. If a cell address is read, as shown by arrow 132, the ABR controller forwards the address to transmitter 84 of FIG. 5 which sends out the cell to the network. After that, as shown by arrow 136, the ABR controller reads the Tx queue again.

Following arrow 134, if a connection ID is read from the Tx queue, the ABR controller reads connection states stored in ABR table 86 of FIG. 5. If this connection has exceeded its transmission limit, i.e., the total number of cells transmitted reaches a limit set by an external processor, the ABR controller submits an OUT_LIMIT request to PRQ 88 of FIG. 5 as shown by arrow 138 and no more cells of this connection are transmitted. After seeing an OUT_LIMIT request, an external processor may reactivate the connection after changing the allowable cell rate ACR for the connection, and/or when certain conditions are met by writing the connection ID to sche_in_2 register 102 of FIG. 6 which is periodically read by the network interface controller. This allows an external processor to automatically stop cell transmission of a connection by setting a cell transmission limit and make some adjustment to the connection when it is stopped. It also serves as a safeguard to prevent an ABR connection from sending at a high rate for a long period of time when an external processor fails to respond to requests submitted at PRQ 88.

Following arrow 140, if a connection does not exceed its transmission limit, the ABR controller then determines the type of cell that should be sent for the connection according to the information read from the ABR table. One rule is that a forward RM cell should be sent for every Nrm cells sent, where Nrm is an ABR parameter that is stored in an ABR table. ABR controller 82 also implements a mechanism by using two bits for each connection, frm_in and frm_out, to allow an external processor control the transmission of forward RM cells. Specifically, by setting frm_in different from frm_out, an external processor instructs ABR controller 82 send a forward RM cell. After sending the forward RM cell, ABR controller 82 sets frm_out equal to frm_in. Since an external processor and ABR controller 82 write different bits, no race condition can happen in updating them. A forward RM cell can be preassembled by an external processor and stored in an external memory pointed by an address stored in ABR table 86. An ATM network interface controller may insert a sequence number into a forward RM cell while sending out the cell. Before a forward RM cell is sent, ABR controller 82 submits a FRM_TX request including a time stamp recording the current time to PRQ 88 to allow an external processor adjust the allowable cell transmission rate for the connection.

Transmission of a backward RM cell is controlled by four bits: a brm_in bit and a brm_pri bit written by an external processor, a brm_out bit written by ABR controller 82, and a frm_after_brm bit which is set the ABR controller when a forward RM cell is sent. A backward RM cell is sent if brm_in is different from brm_out and at least one of the following is true: (1) brm_pri is set, (2) frm_after_brm is set, or (3) there is no data waiting for transmission. The ABR controller resets brm_pri, frm_after_brm, and sets brm_out equal to brm_in after sending the backward RM cell. Again, a backward RM cell can be preassembled by an external processor and so an ATM network interface controller can directly fetch it from an external memory and send it out. An external processor can always send an RM cell by writing its address at sche_in_2 register 102 of FIG. 6.

The above described cell type determination mechanism implemented by ABR controller 82 enables an external processor to control generation of RM cells in a way specified in the ATM Forum document mentioned above or some other protocols. It will thus be appreciated that allowing an external processor to control generation of RM cells is one of major features of the subject traffic management system which gives an ATM end system the ability of following the evolution of ABR flow control without having to change the controller hardware.

Referring again to FIG. 6, following arrow 142, after a cell is sent, ABR controller 82 calculates dt for the connection in the way described above to schedule a transmission time in the shaper for the next cell of the connection. The ABR controller also records any state changes of the connection in ABR table 86.

When a forward RM cell is received by a network interface controller, as shown by arrow 144, a FRM_RX request containing the received RM cell and the brm_out bit indicating whether or not the previously received forward RM cell has been sent back is submitted to PRQ 88 to allow an external processor process the cell and turns it around as a backward RM cell in a way described above. When a backward RM cell is received, as shown by arrow 146, a BRM_RX request containing the received RM cell is submitted to PRQ 88 to allow an external processor process the cell which usually results in changes of ACR for the connection as described in the ATM Forum document mentioned above. On receiving a data cell, the network interface controller records its EFCI bit in the cell header which may be included in a FRM_RX request to PRQ 88 to be used to construct a backward RM cell as specified in the ATM Forum document mentioned above.

Since the assembly of forward RM cells, interpretation of backward RM cells and rate adjustments for ABR connections may all be performed by an external processor, an ATM end system using the subject traffic management system has the flexibility of adopting various RM cell formats and implementing various rate adjustment algorithms without having to make any changes to the hardware of a network interface controller. It will thus be appreciated that allowing an external processor to process RM cells and adjust transmission rates is another one of major features of the subject traffic management system which gives an ATM end system the ability of following the evolution of ABR flow control without having to change the controller hardware.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In an ATM network having available bit rate flow control, a network interface controller at a node of said network for controlling the rate at which cells are injected into said network at said node to control the flow of said cells, said controller including an external processor having an external memory and means for adjusting the rate at which cells are injected into said network;

an available bit rate controller; and, means for coupling said available bit rate controller to said external processor, said available bit rate controller having means for submitting available bit rate requests to said external processor for the adjustment of the rate at which said cells are injected into said network, said means for submitting said available bit rate requests to said external processor including means for submitting said requests when said network interface controller sends or receives a resource management cell, means responsive thereto for generating and sending a resource management cell over said network, and means for initiating processing by said external processor when a cell transmission limit has been exceeded such that said network interface controller reads data from said external memory, determines what cell to send, and what transmission rate to use in the transmission of said cells.

2. The network interface controller of claim 1, wherein said available bit rate controller includes means coupled to said external memory for processing said requests, and means coupled to said external memory for reading data from said external memory and for adjusting cell transmission rate.

3. The network interface controller of claim 2, wherein said available bit rate controller includes means for generating resource management cells.

4. The network interface controller of claim 1, wherein said available bit rate controller includes a traffic shaper for controlling cell transmission rates.

5. The network interface controller of claim 1 wherein said means for coupling said external processor to said available bit rate controller includes a memory write line from said available bit rate controller to said memory, a memory read line from said memory to said available bit rate controller and means for connecting said external memory to said external processor, whereby said external memory is realized as a dual-ported memory for coupling said network interface controller with said external processor.

6. In an ATM network having available bit rate flow control, a network interface controller at a node of said network for controlling the rate at which cells are injected into said network at said node to control the flow of said cells, said controller including an external processor having an external memory and means for adjusting the rate at which cells are injected into said network, an available bit rate controller, and means for coupling said available bit rate controller to said external processor, said available bit rate controller having means for submitting available bit rate requests to said external processor for the adjustment of the rate at which said cells are injected into said network, said available bit rate controller including a traffic shaper for controlling cell transmission rates, said traffic shaper including, a timing chain and a delay queue coupled to said timing chain for delaying the transmission of a cell for an extended period of time, thus to accurately and independently control a wide range of cell transmission rates for multiple cell streams.

7. The network interface controller of claim 6, wherein said delay queue causes a predetermined delay in the transmission of a corresponding cell when the delay associated with the total number of slots of said timing chain has been exceeded.

* * * * *